United States Patent

Booth et al.

[15] 3,697,734

[45] Oct. 10, 1972

[54] DIGITAL COMPUTER UTILIZING A PLURALITY OF PARALLEL ASYNCHRONOUS ARITHMETIC UNITS

[72] Inventors: William C. Booth, Reisterstown, Md.; Leslie T. Kyser, Binghamton, N.Y.

[73] Assignee: The Singer Company, New York, N.Y.

[22] Filed: July 28, 1970

[21] Appl. No.: 58,970

[52] U.S. Cl. ....................235/164
[51] Int. Cl. ....................G06f 7/48
[58] Field of Search......235/156, 164, 160, 159, 168, 235/175

[56] References Cited

UNITED STATES PATENTS

| | | | |
|---|---|---|---|
| 3,551,665 | 12/1970 | Powers et al. | 235/175 |
| 3,037,701 | 6/1962 | Sierra | 235/159 |
| 3,043,509 | 7/1962 | Brown et al. | 235/156 |
| 3,193,669 | 7/1965 | Voltin | 235/164 |
| 3,515,344 | 6/1970 | Goldschmidt et al. | 235/175 |

*Primary Examiner*—Charles E. Atkinson
*Assistant Examiner*—David H. Malzahn
*Attorney*—Francis L. Masselle, William Grobman and Charles S. McGuire

[57] ABSTRACT

A digital computer in which the overall speed of operation is increased above that of other present-day computers. This increase in the speed of operation is achieved by (a) the utilization of flow-through devices in the arithmetic units, and (b) dividing the arithmetic units into several parts to handle the arithmetic modifications of control words, arithmetic modifications of fractions, and arithmetic modifications of exponents simultaneously. The control functions of this computer are clock-controlled, but the memory may be any random access or sequential memory. The logical design of the overall system is arranged to accomplish the desired objects of high speed.

18 Claims, 11 Drawing Figures

INVENTOR.
WILLIAM C. BOOTH
LESLIE T. KYSER
BY
William Grolman

INVENTOR.
WILLIAM C. BOOTH
LESLIE T. KYSER
BY
William Grolman

INVENTOR.
WILLIAM C. BOOTH
LESLIE T. KYSER
BY
William Grolman

INVENTOR.
WILLIAM C. BOOTH
LESLIE T. KYSER
BY
William Grolman

INVENTOR.
WILLIAM C. BOOTH
LESLIE T. KYSER
BY
William Grolman

INVENTOR.
WILLIAM C. BOOTH
BY LESLIE T. KYSER

INVENTOR.
WILLIAM C. BOOTH
LESLIE T. KYSER
BY
William Grolman

DIGITAL COMPUTER UTILIZING A PLURALITY OF PARALLEL ASYNCHRONOUS ARITHMETIC UNITS

This invention relates to electronic devices, and more particularly, to electronic digital computers.

Electronic digital computers have proliferated in recent years until they now have reached into all aspects of our lives. With the aid of high-speed digital computers man has finally been able to fly to the moon and set foot on its surface, to explore the surface of Mars, and to plan further extraterrestial travel and exploration. Yet, in spite of the primary roles played by computers in these exotic ventures, the individual operations performed by the computers are quite ordinary. General-purpose digital computers usually can add, subtract, multiply, divide, and compare quantities. In some cases, the computer also may be designed with a special capability such as the taking of square roots, but usually, only those functions listed are performed by the computers. How, then, has such a machine which performs only everday operations become one of the key elements in successful space travel, high-resolution communications over millions of miles, and other great scientific developments? One of the characteristics of electronic computers which is responsible for their great successes is the speed with which they carry out those operations they do perform.

The great speed with which modern digital computers operate have enabled them to perform computations which heretofore were not possible because of the amount of time they required. In addition, their great speed has enabled computers to be used in business in ways which were not heretofore contemplated. It is the speed of the central processor which permits it to be multiplexed to service several branches of the same business.

Most electronic digital computers are of the synchronous type. This means that all of their operations are timed by central clocks. In a synchronous computer the clock generates electrical pulses at a fixed rate, and the presence of a clock pulse at a component in the computer conditions that component to operate. Thus, all of the operations in the computer occur only when clock pulses are present, and the clock in a synchronous computer is important. But it is that very clock which limits the overall speed of operation of the computer. Since everything in a synchronous computer is timed, nothing can happen until the timing pulse occurs. Operations take place when the timing pulse arrives even though the previous operation may have been completed for some time. To ensure that no operations are prematurely cutoff, the timing pulses must have built-in safety factors. Often, the clocks are designed so that the timing pulses occur at one half the speed of the slowest operation. In addition, since the shifting of information words through many digit positions is one of the most common computer operations, and in a synchronous computer each shift takes place only when a timing pulse occurs, the overall computer operation is slowed down by shifting. In fact, a shifting operation usually requires the amount of time that is occupied by the number of timing pulses required, and this equals the number of shifts performed.

The above-mentioned limitations of present-day synchronous computers logically lead to ways in which electronic digital computers can be rendered more time efficient. The computer of this invention is designed to further increase the overall speed of operation of digital computers, and thereby greatly to improve their value. To accomplish this, the design of this computer not only improves the overall operational speed of computer, but also improves the logical organization and design to simplify the construction and minimize the maintenance of digital computers.

It is an object of this invention to provide a new and improved electronic computer system.

It is another object of this invention to provide a new and improved electronic digital computer system.

It is a further object of this invention to provide new and improved asynchronous digital systems having greatly simplified control logic.

It is still another object of this invention to provide new and improved flowthrough digital systems having increased operational speed.

Other object and advantages of this invention will become more apparent as the following description proceeds, which description should be considered together with the accompanying drawings in which.

Before embarking upon a detailed description of the drawings, a general discussion of the basic philosophy and overall construction and organization of the computer of this invention should be of some assistance. As with most digital computers, this computer comprises a memory unit, a control unit, and an arithmetic unit. Because this computer is designed to increase computer operating speed, a random access memory such as a bank of magnetic cores is preferred but not required. The memory may be a standard, off-the-shelf memory unit and no detailed description of such will be given here.

A major increase in operating speed is achieved in the arithmetic unit by using asynchronous flow-through devices. By this means, the times required for performing individual arithmetic operations are reduced. Arithmetic operations which are to be performed upon control signals or instructions are performed by the arithmetic unit in a special portion thereof, permitting information processing and instruction processing proceed simultaneously. This additionally speeds up the overall operation of the computer. For the most part, however, the control unit is clock controlled. In addition to the points indicated above, design features have been incorporated into this computer to increase the speed of operation. As the description proceeds, these design features will be mentioned.

Figure 2A:
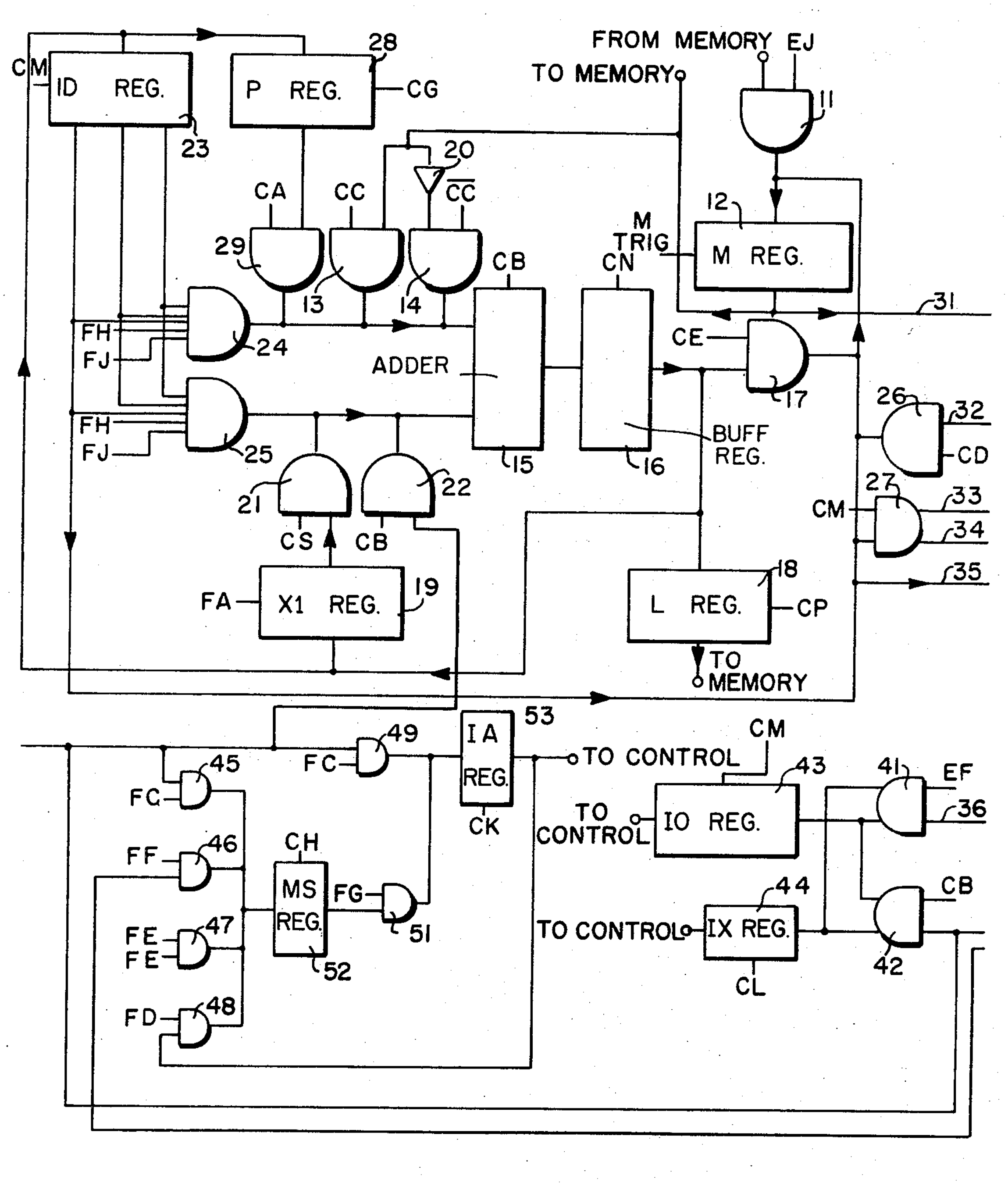
FIG. 2A–2C is a logical block diagram of the arithmetic unit of the computer of this invention.
Figure 2B:
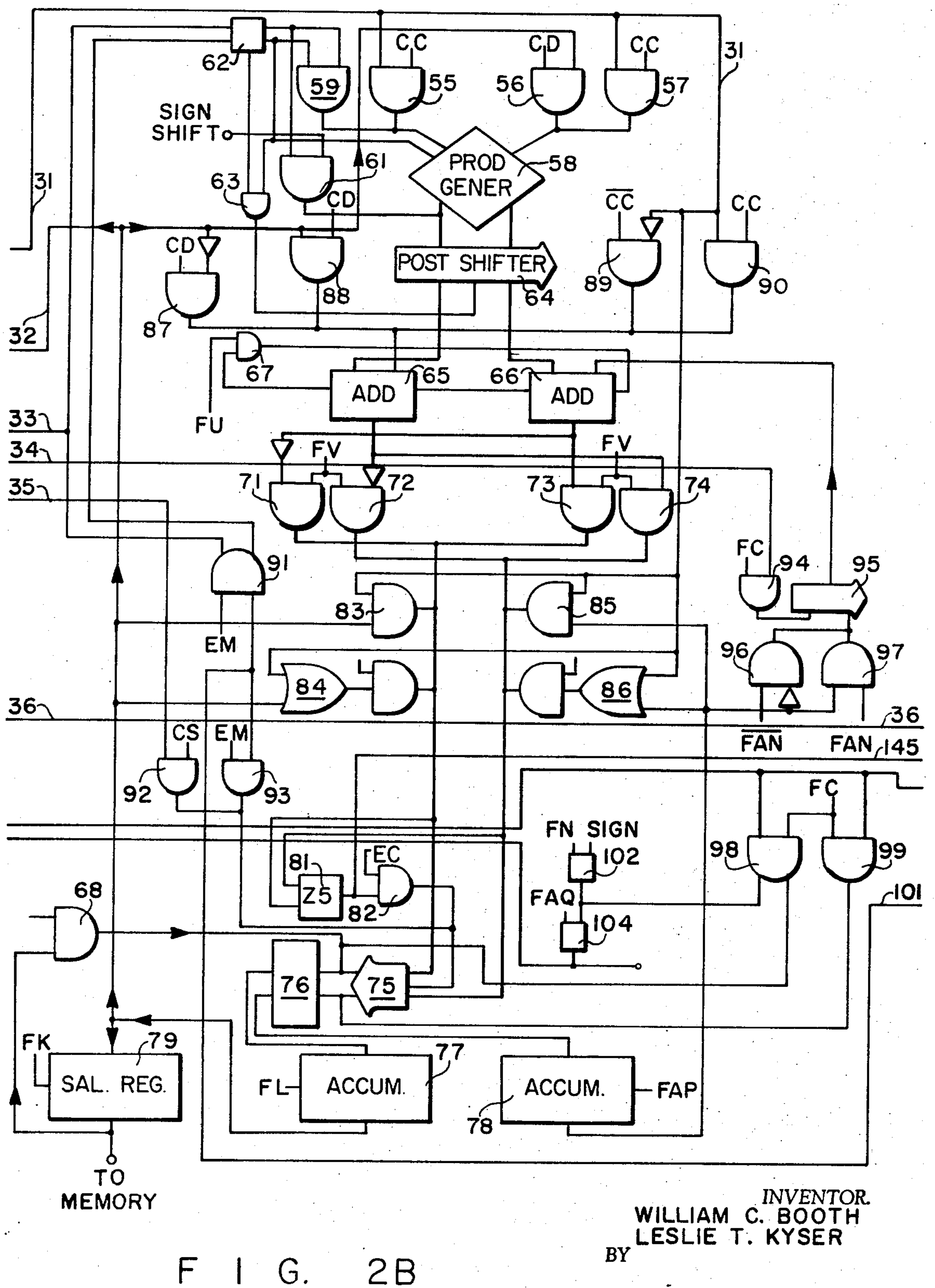
Figure 2C:
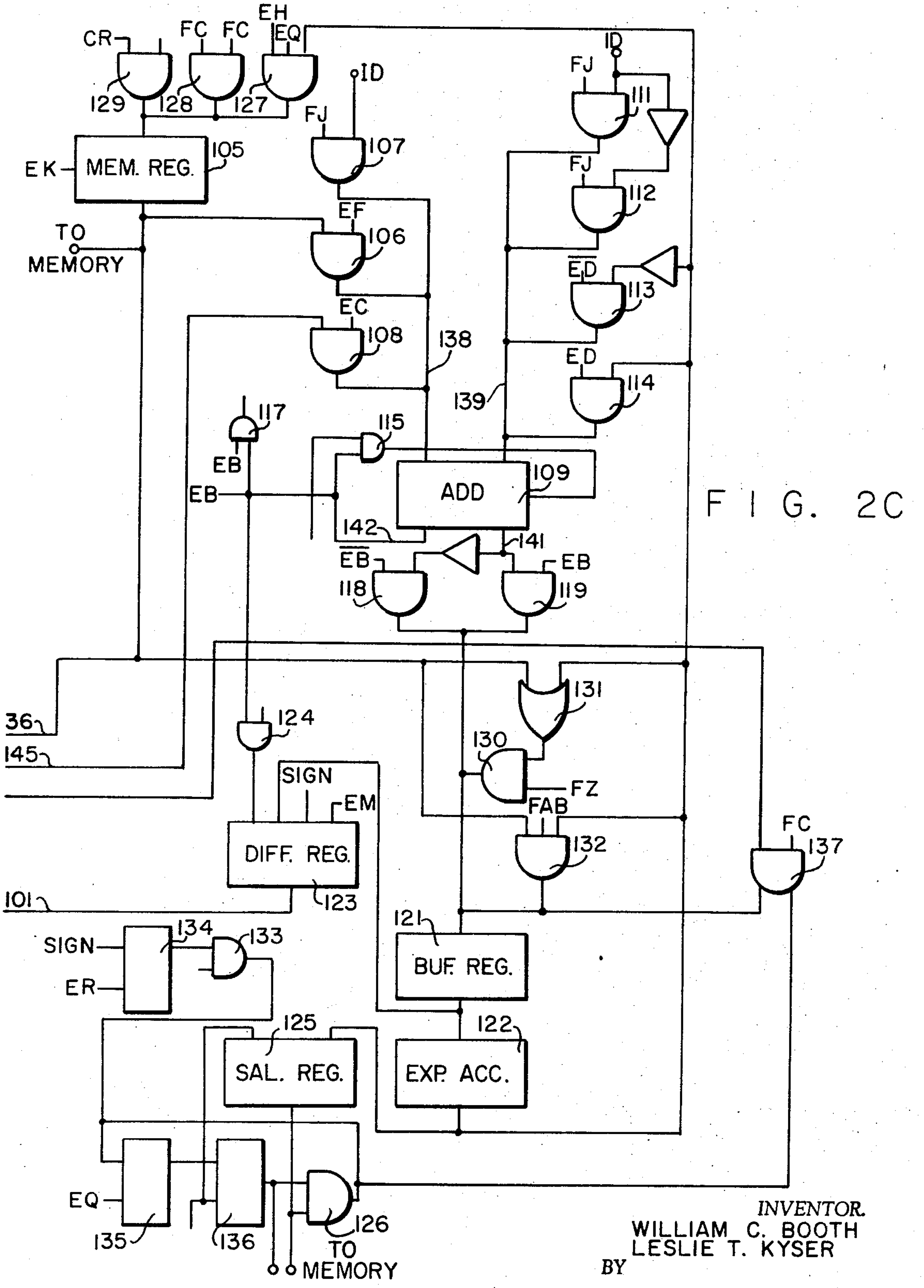

For example, the arithmetic unit shown in FIG. 2A–2C is divided into three parts. That portion shown in FIG. 2A can be called the control arithmetic unit and performs arithmetic operations upon instructions and control signals as they are required. FIG. 2B illustrates a fraction arithmetic unit which performs arithmetic operations including shifting upon the fraction portion of a quantity. And on FIG. 2C an exponent arithmetic unit is shown. The design of the arithmetic unit itself provides the system with increased speed of operation. For example, by handling the fraction and the exponent separately, the time for performing arithmetic operations can be shortened, and, at the same time that a quantity is being processed in the fraction and exponent arithmetic units, instructions can be processed in the control arithmetic unit.

The apparatus of this invention is designed to handle both fixed and floating-point numbers. In most computers, the format of the digital data word is predetermined, and the information to be processed must be encoded into the proper form before being applied to the computer. This operation is usually accomplished more conveniently in fixed-point than floating-point format, whereas the computations performed by the computer are more conveniently accomplished in floating-point format. To operate under these conditions, the computer of this invention initially receives the information to be processed in fixed-point notation and stores it in its memory. At the appropriate time, the fixed-point information word is retrieved from memory and a float instruction shifts it until the point is immediately to the left of the first true bit, or "one". The number of shifts to accomplish this is counted and is subtracted from a scale function (including sign) which is stored as eight digits of the 25-digit float instruction word. Since, in any situation, the programmer knows the range of the input information, he can choose the positive or negative scale function for the float instruction to meet the requirement of the particular situation. The eight digits which represent the scale factor after shifting are called the exponent in this description, and the remaining 17 digits (including sign) are the fraction. Thus, the exponent arithmetic unit processes the eight-digit portion of the information word, and the fraction unit processes the 17 digits of the fraction or value portion of the information word. After the information word is in the proper format, the computer may again store it in memory for later use.

Figure 1:
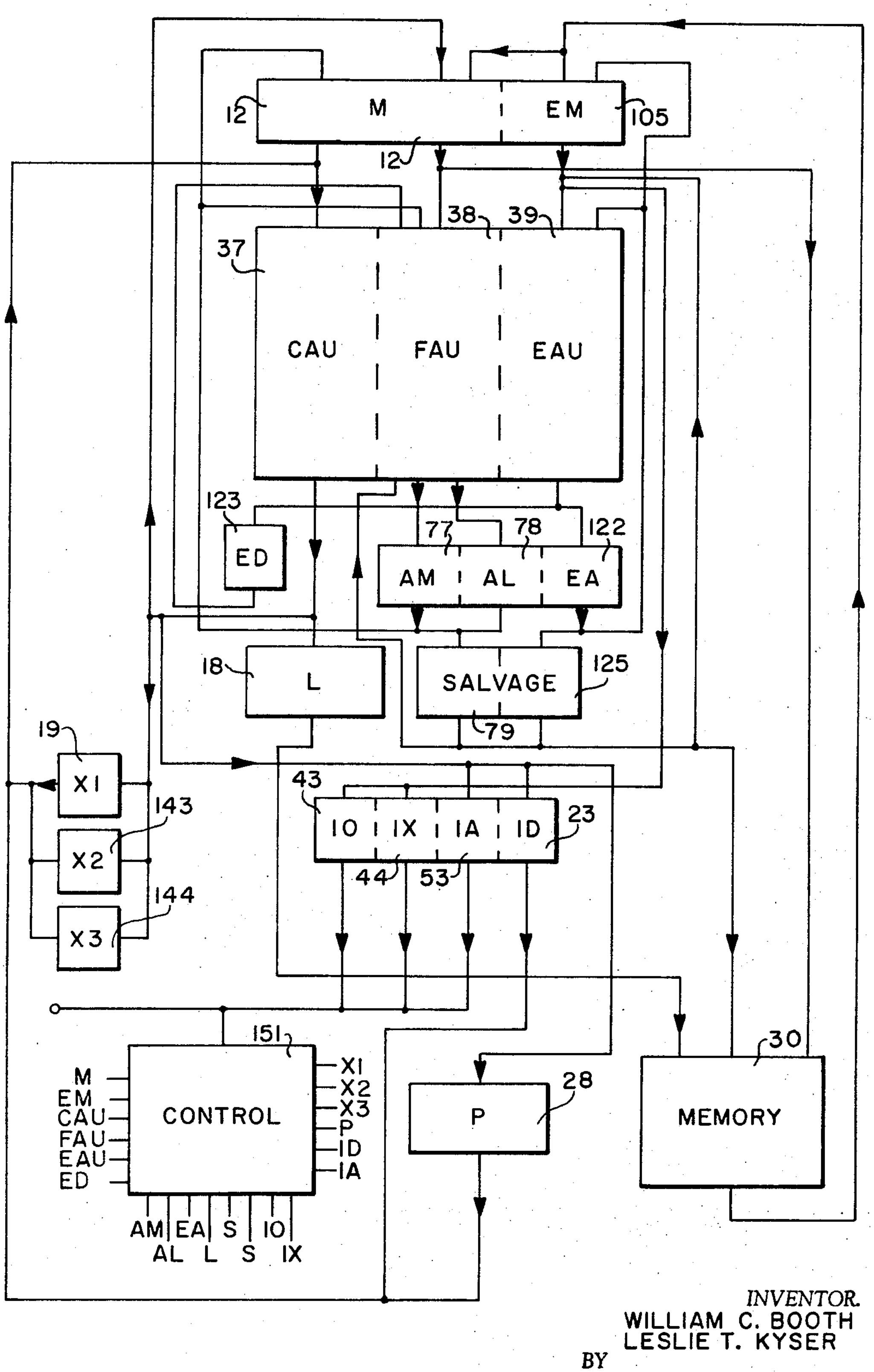
FIG. 1 is a general block diagram of the major components of the computer of this invention.

Referring now to the drawings in detail and more particularly to FIG. 1, the major components of the computer are shown thereon in block form. The three arithmetic units, the control arithmetic unit (CAU) 37, the fraction arithmetic unit (FAU) 38, and the exponent arithmetic unit (EAU) 39, receive information from the associated memory registers 12 and 105. The memory registers are shown in two parts, M and EM. The output of the CAU 37 is applied to the inputs of an L register 18; three X registers 19, 143, and 144; and to the memory register 12 for further application to the arithmetic units. In addition, the output of the control arithmetic unit 37 is also applied to the inputs of the instruction registers 23 and 53 and the P register 28. The fraction arithmetic unit 38 has two outputs which are applied individually to the inputs of two accumulators (AM and AL) 77 and 78. Actually, the two accumulators form a single, double-word size accumulator to handle the results of multiplication and other processes, but for ease of operation, description, and design, the double-word register is considered to be two separate, one-word registers. The output of the exponent arithmetic unit 39 is applied to the input of an exponent accumulator 122 and an exponent difference register 123. The outputs of the accumulators 77 and 78 are applied to the input of one salvage register 79 and the M register 12 and are fed back as a separate second input to the fraction arithmetic unit 38. Similarly, the output of the exponent accumulator 122 is applied to the input of a second salvage register 125 and the EM register 105 and is also fed back to form a second input to the exponent arithmetic unit 39. The outputs from the L register 18 and the two salvage register 79 and 125 are applied as inputs to the memory 30. In addition, the output from salvage register 79 is applied as an input to the FAU 38 while the output from the salvage register 125 is applied as an input to the EAU 39. The output from M register 12 is also applied to the input to the memory 30. The output from the memory 30 is applied to the inputs of the memory registers 12 and 105. The output of the exponent difference register 123 is applied as a separate input to the FAU 38. The outputs from the three index registers 19, 143, and 144 are applied to the inputs to the CAU 37. The instruction register is divided into four parts; and ID register 23, an IX register 44, an IA register 53, and an IO register 43. The inputs to the ID register 23 and the IA register 53 come from the output of the CAU register 37. The output from the ID register 23 is applied as an input to the CAU register 37. The inputs to the IO register 43 and the IX register 44 are supplied from the output of the EM register 105. The outputs from the IO register 43, the IA register 53, and the IX register 44 are applied as inputs to the control unit 151 which receives another input from the manual switch board used to stop and start the computer and the like. The control unit 151 supplies individual control signals to each of the other units shown in FIG. 2A–2C and separate individual control signals to many of the individual internal components of this unit. To shown all of these output lines from the control unit 151 would clutter the drawing sufficiently to render it chaotic. Therefore, the outputs from the control unit are shown symbolically as a single line for each of the other units of FIG. 1. These lines are appropriately labeled.

The processor of this computer comprises three separate parts, in function if not in structure, and it is so shown in FIG. 1. The processor is so connected with the rest of the system that each of the individual arithmetic units 37, 38 and 39 may function on its own problem simultaneously with the others. Information is supplied to the arithmetic units from what are really two separate memory reisters 12 and 105. Information is applied to the inputs of the memory registers 12 and 105 from the memory 30. Any information from the memory 30 is applied through the appropriate memory registers 12 and 105 to the inputs of the CAU 37 or the FAU 38, and each unit operates independently of the other. The output from the CAU 37 is applied through a common bus to the inputs of the L register 18, the ID register 23, the X registers 19, 143, and 144, the P register 28, or back again to the input to the memory register 12. In this manner, the output from the CAU 37 may pass unaffected back into the memory register pass 12, or it may be stored in the L register 18 or in the X registers or the P register 28. The output from the L register is a memory address which is applied to the input of the memory 30. The output of the CAU 37 is also applied to the input of the ID register 23 in which the information may be stored or through which it may be passed on as an input back to CAU 37. Thus, through the control arithmetic information which is processed through 37 may be applied directly to the L register 18; to the ID register 23; the P register 28; or to any of the X registers 19, 143, or 144 for storage; or it may be returned to the memory register 12. Information returned to the memory register 12 is, of course, made available for reprocessing by the CAU 37, and this is also the case with information supplied from the outputs from ID register 23, the P register 28, or the X registers which supply the information back into the CAU 37.

In the meantime, the FAU 38 has received information from the memory register 12, has processed that information, and has stored that information in the accumulators 77 and 78. The outputs of the accumulators 77 and 78 are now applied to either or both of the FAU 38 or the salvage register 79, which holds that information temporarily for later transmission to the memory 30, or to the input of the FAU 38 for reprocessing.

At the same time, the exponent arithmetic unit 39 is processing information supplied to it from the memory register 105. The output of the EAU 39 normally is applied to the input of the exponent accumulator 122. However, in one operation, which is determining the difference between two exponents, the output of the EAU 39 is applied to the input of the exponent difference register 123, whose output is supplied as a separate input to the FAU 38 wherein that information is utilized. The output of the exponent accumulator 122 is applied either as an input to the EAU 39 where the information may be reprocessed, to the input of a salvage register 125 for storage therein, or to the input of the EM register 105.

The system shown in FIG. 1 is a broad overview of the overall computer illustrated in a broad manner with the various components shown interconnected for operation. Details of construction and operation of the apparatus of this invention are shown in the following drawings and described below.

In FIG. 2A–2C, the reference character 11 on FIG. 2A designates a gate which has one input connected from memory. A control signal, the memory transfer signal, is also applied to the gate 11, and, when both signals are present, information from memory passes through the gate 11 and is applied to the input of an M register 12. The output from the M register 12 is simultaneously applied along line 31 to the fraction arithmetic unit on FIG. 2B and to the inputs of two AND gates 13 and 14 with gate 13 receiving direct and gate 14 receiving inverse information through an inverter 20. Each of the AND gates 13 and 14 has a control signal applied to it for opening the gate, but only one of the two control signals can exist at any time. Information passing through the gates 13 and 14 is applied to a first channel feeding the augend input to an adder 15. In addition, a gate 29 and a gate 24 also feed the augend input of the adder 15. The output from the adder 15 is applied through a buffer register 16, to an L register 18, an X1 register 19, an ID register 23, and a P register 28. The output from the buffer register 16 is also applied through a gate 17 to the input of the M register along with the output from a gate 26 which receives information along a line 32 from the fraction arithmetic unit. The output from the L register 18 applies information to the memory. The second channel, the addend input to the adder 15, is fed by three gates, 21, 22, and 25. Information input to gate 21 comes from the output of the X1 register, and the input to the gate 22 is obtained from an array of register set switches on a control panel (not shown). Gate 25, as well as gate 24 which feeds the first channel of the adder 15, is fed with information from the ID register. Since the ID register 23, part of the instruction register, can provide several types of information which may be parts of the same word, three output lines are shown. The P register 28 supplies the gate 29 with information to be transferred to the first channel. The instruction register is fragmented on FIG. 2A with four portions identified as ID register 23, IA register 53, IO register 43, and IX register 44. The IO and IX registers 43 and 44 receive inputs from both of gates 41 and 42. The information input to gate 41 comes from the fraction arithmetic unit along line 36, and the information input to gate 42 comes from the register set switches on the control panel. In addition, a single-bit portion of the ID register is shown as the IA register 53 whose output is applied as an input to the control unit and to a gate 48. The output of the gate 48 is applied in parallel with the outputs of gates 45, 46, and 47, to a single-bit register 52. The output of the register 52 is applied to gate 51, the output of which is connected to the input of the register 53 together with the output of gate 49. The inputs to gates 45 and 49 come from the register set switches on the control panel. The input to gate 46 is obtained from the output from the AS register 104 on FIG. 2B. The input to gate 47 is obtained from the memory 30.

The symbols on FIG. 2A–2C are consistent in shape, but not in size. The size of the symbol is a rough indication of the capacity of the device itself. For example, the M register 12 is shown as a large register, whereas the IA register 53 is shown as a small register. The M register 12 has a capacity, in the example shown, of 16 bits whereas the IA register 53 is a single-bit register. Although the relative size of each symbol indicates the relative size of the device it represents, no attempt to establish an accurate scalar relationship has been made. Thus, the M register 12 is not 16 times as large as the IA register 53. However, the sizes of the symbols themselves do indicate whether a gate or a register is a full word register or gate or merely contains a portion of the word. With respect to gates, a large gate really represents a plurality of gates in parallel. Further, this computer is described as a straight binary computer because both the device and the description of the device are simpler, but the principles, design philosophy, and arrangement readily can be used in any radix system. The registers such as the M, I, P, L, and X registers can be triggered devices such as banks of triggering or clocking flip-flops. This means that information is transferred into the register when a suitable trigger signal is received thereby, but once the information is stored in the register, that information is available at its outputs.

In the operation of the control arithmetic unit, the adder 15 is the central element. The control arithmetic unit is used to modify those portions of the instructions which require modification. Usually, these portions comprise addresses. There are many ways in which addresses are changed in the normal operation of a digital computer. For example, if an instruction requires a preprogrammed subroutine which is repeated often, that subroutine may be permanently stored in fixed memory locations. The contents of the program register P must then be modified by the proper amount to address that subroutine when it is needed. In many computers the single arithmetic unit is used to modify instructions as well as information handled by the system and those operations had to be performed serially, which is a slow way to get the results. Thus, the provision of a separate arithmetic unit for instructions permits the processing of information and instructions simultaneously. Instructions are received from memory by the gate 11, and when the memory transfer signal EJ is present, that information from memory is transferred into the M register 12. Once in the M register 12, the information is available to the system. The output of the M register 12 contains both direct and complement information. The direct information is applied directly to gate 13, and the complement information is applied through the inverter 20 to the gate 14. When the appropriate control signals, the memory control-to-adder signals, are applied to gates 13 or 14, the information contained in the M register 12 is transferred through the appropriate gate to the first input to the adder 15. The M register 12 is the main memory transfer register which links the processor input with the memory. The M register 12 which is shown in FIG. 2A is only a portion of the entire M register as it exists in the system. Assuming a computer with a 25-bit word, the whole M register could be 25 bits, 16 of which are in the control arithmetic unit register 12. Similarly, by way of example, the instruction register could be a 25-bit register with 16 bits in ID register 23, 6 bits in the IO register 43, two bits in the IX register 44, and one bit in the IA register 53. As shown on FIG. 2A, the IO register which contains the operation or order portion of an instruction, has its output connected to the control unit. Similarly, the outputs of both the IX and the IA registers 44 and 53 are connected to the input of the control unit.

An instruction is taken from the memory address contained in the P register 28, and is passed through the gate 11 into the M register 12. The address portion of the instruction is applied to the inputs of the gates 13 and 14 for application to the input of the adder 15. All instructions from memory are applied by register 12 to the adder 15 which often merely serves as a conveyor. For a simple register-to-register transfer, the address information is not affected by its passage through the adder 15. The address portion of the instruction is applied to the buffer register 16 from the adder 15, and this information is then inserted into the ID register 23. The address portion of an instruction may be used directly to read information from memory or to write information into memory, or it may be modified by other information. Since the address may be modified by information applied through gate 21 from the index register 19 to the second input channel to the adder 15, the output of the ID register 23 is applied through the gate 24 to the first input of the adder 15. The adder 15, using the information supplied to its two inputs, produces the sum of that information and applies the sum through the buffer register 16 to the appropriate portion of the circuit. Should the address contained in the ID register be modified by information in the index register 19 to produce a new address, that new address is applied to the buffer register 16 which, in turn, supplies it to the L register 18. The output of the L register 18 can then be applied to the address input to the memory. The address in the ID register 23 also may be modified by information coming from the M register 12 through either of the gates 13 or 14 to the first input to adder 15. For this reason, the output of the ID register 23 is also applied through the gate 25 to the second channel input of the adder 15. In addition to the above, each time an instruction is retrieved from memory, the value contained in the P register 28 is increased by one. The P register thus contains the memory address of the next instruction. Increasing the value of the information of the P register 28 is accomplished by the adder 15. Under manual control, information can be applied to the processor by switches on the control panel. The information is inserted into the second channel of the adder 15 through gate 22 and can be used to modify the contents of the ID register 23, the P register 28, the M register 12, the L register 18, or the input register 19. The L register 18 is an output register to memory for the address portion of the instruction. Information contained in the ID register also can be applied either directly along line 35 or indirectly through gate 27, line 33 and line 34 to the fraction arithmetic unit shown on FIG. 2B. Information from the fraction arithmetic unit may pass through the line 32 to the input of the gate 26 and be applied to the input of the M register 12. The inputs to the IO register 43 and the IX register 44 come from line 36 through gate 41, or from the register set switches through gate 42. The outputs of both the IO register and the IX register 43 and 44 are connected to the control unit, to decoders contained therein.

The index register 19 actually comprises three separate registers, the gate 21 comprises three separate gates, and the contents of the IX register 44 determines which of these three index registers, if any, is to be used for indexing the contents of the ID register 23. In addition, information may be applied through the gate 42 to both the IO and the IX registers from the switches on the control panel. The IA register 53 is a single-bit register such as a flip-flop which, when set, indicates an indirect address. The output from the IA register 53 is applied through a gate 48 to the input of the MS register 52, also a single-bit register, for use in immediate instructions where the operand is contained in the address field. The operations described above are all under the control of output control signals shown on FIG. 3.

The fraction arithmetic unit, as explained above, receives the 16 bits which represent the number in the data word and processes those 16 bits as a single entity. The fraction arithmetic unit comprises a multiplier, a plurality of shifters, a double-size adder, a double-capacity accumulator, a salvage register, a buffer register, a zero scanner, a right shift converter, and a plurality of gates. All of these components are flow-through devices which merely require the presentation at the input of the data to be processed for the processing of that data to take place without internal clocking. Information from memory comes through the M register 12, on FIG. 2A, through line 31 to one of the inputs of each of gates 55, 57, 90, 83, 84, 85, and 86. The gate 55 has its output connected to the multiplicand input of a product generator 58, and the gate 57 has its output connected to the multiplier input of the product generator 58. Thus, any word from memory can be applied to either of the two inputs of the product generator 58. Another gate 56 provides a means for inserting into the multiplier input of the product generator 58 other information which has already been processed. The product generator 58 often produces outputs that are double-length words, and for this reason the product generator 58 has two outputs, one output for the 16 most significant digits and the other output for the 16 least significant digits. These two outputs are simultaneously applied to separate inputs of a post shifter 64. The shifter 64 also has two 16-bit outputs, and the 16 most significant bits are applied to the addend input of the 16-bit adder 65 while the 16 least significant bits are applied to the addend input of the 16-bit adder 66. The augend input to the adder 65 is supplied by either of two gates 87 or 88 both of which receive input information from the output of one of the accumulator registers 77. One of the gates 87 and 88 passes information in direct form while the other one passes information in the inverted form. The augend input to the adder 65 can be supplied information by either of the two gates 89 or 90, both of which receive their inputs from the memory register 12. Again, one of the gates 89 and 90 passes information in the direct form and the other gate passes information in the inverted form. The augend input to the adder 66 is supplied information from the output of a right shifter 95 which receives information from either of gates 96 or 97 from the accumulator register 78. One of the gates 96 and 97 passes information in a direct form and the other passes information in the inverted form. The shifter 95 receives shift instruction information from the ID register 23 through the line 34 and a gate 94. The outputs from the two adders 65 and 66 are applied to the inputs of two pairs of gates 71, 72, 73, and 74, with the output from the adder 65 applied to gates 72 and 74, and the output from the adder 66 applied to the gates 71 and 73. One gate of each pair passes information in the direct form and the other gate passes information in the inverted form. The outputs from gates 71 and 73 are applied to a first channel input of a double-capacity left shifter 75, and the outputs from the gates 72 and 74 are applied to a second channel input of the left shifter 75. Shift instruction information is applied to the left shifter 75 from the instruction register 23 along line 35 and through gate 92, as well as from the exponent arithmetic unit along line 101 and through a gate 93, and also from the outputs of the adders 65 and 66 through a zero scanner 81 and a gate 82. The zero scanner 81 can be called a normalizer. Two outputs from the left shifter 75 are applied to buffer register 76 which passes its two outputs to the two accumulator registers 77 and 78. The accumulators 77 and 78 are shown as two separate registers (the register 77 accumulating the 16 highest order bits, and the register 78 accumulating the 16 lowest bits) to render the description clearer.

To permit the normal input of information to the accumulator 77–78 and to the salvage register 79, the register set switches on the control panel are connected to gates 98 and 99. Gate 98, when opened by a control signal, allows the register set switches to provide data for the 16 most significant digits of the buffer register 76 from which it can be passed on to the accumulator 77 and the salvage register 79. Gate 99, when opened by a control signal, allows the register set switches to provide data to the least significant digit positions of the buffer register 76 and the accumulator 78. In addition, the salvage register 79 output can be applied through the gate 68 to the most significant 16-digit positions of the input of the buffer register 76, and from there they can be passed on to the accumulator 77. The carry output from the most significant digit of the adder 65 can be applied to the carry input of the adder 66 through gate 67. The output from the ID register 23 is applied through the gate 27 and the lines 33 and 34, or the output from the ED register 123 (FIG. 2C) is applied through line 101 and gate 91 to the right shift converter 62. The output from the right shift converter 62 is applied to the multiplicand input of the product generator 58 through a gate 59. An additional output from the right shift converter 62 is applied through gate 63 to the post shifter 64 to specify whether or not a 16 place shift is required. Further, the output from the right shift converter 62 can be applied through a gate 61 to the most significant half of the input to the post shifter 64 when a sign digit is to be shifted. The AS register 104 is the sign digit of the accumulated quantity and receives its input from the BS register 102 or from the register set switches through gate 98. the BS register receives its input from the control unit which derives the resultant sign for each operation. The output of the AS register 104 is applied to the control unit and/or to the MS register 52 through gate 46.

Since the accumulator register 77 stores the 16 most significant bits, and the accumulator register 78 stores the 16 least significant bits, each 16-bit portion is treated as a separate word. The output of the accumulator register 77 is connected as an input to a salvage register 79, and simultaneously to the inputs of gates 83, 84, 87, 88, 56, and through line 32, to the input of the gate 26, and therethrough to the M register 12. The AND gate 83 and OR gate 84 have their outputs connected to one input of the left shifter 75, and the outputs of gates 87 and 88 are applied as applied to the memory input. In a similar manner, the 16 least significant bits from the accumulator register 78, is simultaneously applied directly to the inputs of gates 85 and 86 and to the inputs of the gates 96 and 97 which feed the right shifter 95. The outputs of the gates 85 and 86 are applied to the other input to the left shifter 75.

The fraction arithmetic unit is the binary unit which handles the fractional portion of numbers in the computer. It can be considered as a chain of separate units in series. Connected in series are the product generator 58, the post shifter 64, the adder 65–66, the left shifter 75, the buffer register 76, and the accumulator 77–78.

Information which is being processed is transferred to the accumulator which comprises two separate registers 77 and 78, each of which register has a capacity of 16 bits. From the accumulator, the information can be returned to the beginning of the chain at the inputs of the product generator 58 or to an intermediate portion of the chain to such as the inputs of the adder 65–66. But in any case, information is collected in the accumulator and held there for further processing. Since the components mentioned are connected in series, and since as few as one of the components can be used in any one operation, they are arranged with appropriate gates and with separate inputs so that each of the components can be separately controlled to process information applied to its inputs or to pass such information through without modification.

In any operation in the arithmetic unit, two inputs are usually required. As mentioned above, information from memory passes through the M register 12 shown on FIG. 2A and then along line 31 to each of the input gates 55 and 57 of the product generator 58. When information from the memory serves as a multiplicand, the gate 55 is opened by a control signal, but when that information from memory is to serve as a multiplier, then gate 57 is opened by the control signal. Similarly, information from the accumulator register 77 is applied through line 32 to the information input of the multiplier gate 56. A control signal opens gate 56 so that the information in the accumulator register 77 can be applied to the multiplier side of the product generator 58. The same information from the accumulator register 77 is applied along the line 32 to one input of gate 26 which serves one input to the M register 12. Since the product generator 58 is a flow-through multiplier, whenever it receives information on both of its inputs it generates the product of that information. When information is to pass through the product generator 58 without modification, it is applied to one input and no information is applied to the other.

The output from the product generator 58 is applied to the inputs of a post shifter 64. Then the shifter 64 is appropriately energized to shift the output from the product generator 58 sixteen places to the right. If the output from the product generator 58 is not to be shifted, then appropriate inputs to the post shifter 64 permit the information applied to its input to pass through unmodified. The outputs from the post shifter 64 are applied to one input to each of the two adder portions 65 and 66, each of which can handle 16-bit words, and the two together are used to handle double-size words. As mentioned, the augend input to each adder section comes from the post shifter 64, and the addend input to the adder section 65, the most significant 16 bits, comes from the accumulator register 77 through line 32 and either of gates 87 or 88, or from the memory to the M register 12, line 31, and either of gates 89 or 90. Similarly, the addend input of the adder section 66 comes from the output of a right shifter 95 which receives its inputs from the accumulator register 78 (16 least significant digits), through gates 96 or 97. The right shifter 95 receives another input from the ID register 23, gate 27, line 34, and gate 94. This second input indicates to the right shifter how far to shift the first input. Thus, the 16 most significant digits of information which are contained in the accumulator register 77 can be applied to the adder section 65 to be added to the output of the post shifter 64. And, as mentioned above, the input to the post shifter 64 comes from the product generator 58 and may be a product, or information obtained directly from memory or the accumulator 77. The 16 least significant digits stored in the accumulator register 78 may be shifted to the right or passed unmodified through the right shifter 95 and applied to the adder section 66 where they are added to the output of the product generator 58 or to information obtained directly from memory or from the accumulator 77. Should information from the product generator 58 be applied to the adder portions 65 and 66 to pass directly therethrough without modification, then no information is applied to the addend inputs of the adder sections 65 and 66.

The shifting which is performed by the fraction arithmetic unit is interesting. The product generator 58 can be used as a shifter by applying the appropriate words at the multiplier component. To shift a multiplicand, the multiplier comprises all zeros except for a one in that position which is equal to the number of spaces the multiplicand is to be shifted. Since the product generator 58 can shift only a limited number of places (16), additional means must be provided to shift the data more places when necessary. The post shifter 64 is utilized for that purpose. In the event that a shift of more than 16 places is required, the post shifter 64 is used to obtain 16 places of shift to the right, and the product generator 58 is used to shift the additional number of places required. A zero scanner 81 can receive information from both outputs of the adder, that of the section 65 and that of the section 66. The zero scanner determines the number of zeros which are present before the most significant one and applies this information to the left shifter 75 to cause the word to be shifted that number of spaces to the left so that the point is adjacent to the most significant one. The number of zeros counted by the zero scanner 81, is applied to the exponent arithmetic unit where it is used to modify the exponent of the floating-point number.

The above description has indicated the connections of the components which comprise the fraction arithmetic unit. In addition, the manner of receiving information from the memory was described. Information from the accumulator register 77, when applied to the line 32, is also applied to the M register 12 through gate 26. The M register 12 has an output which feeds the memory interface for supplying information to the memory. In this manner the results of the operations performed in the fraction arithmetic unit can be stored in memory until they are again required.

The arithmetic unit which performs arithmetic functions upon the exponent portion of the information word is shown in FIG. 2C. Information from memory is applied to the input of the gate 129 whose output feeds the input of the memory register 105. In addition, the register 105 has two other inputs, one from gate 127 whose input is from the output of the exponent accumulator 122, and the other from gate 128 whose input is from the register set switches. The output of the register 105 is applied to a line 36 which is connected to the input to the memory, to the input of gate 41 on FIG. 2A, to the input of the gate 106, to the input of an OR gate 131, and to the input of the AND gate 132. The output of the gate 106 is connected to one input of the exponent adder 109. In addition, that one input to the exponent adder 109 also receives information from a gate 107 whose input comes from the ID instruction register 23, and from a gate 108 whose input comes from the output of the zero scanner 81 shown in FIG. 2B. The other input to the exponent adder 109 comprises a second channel which receives information from the ID register 23 through gate 111, the inverse of the information of the ID register 23 through a gate 112, the output from the accumulator register 122 through gate 114, and the inverse of the information of the accumulator register 122 through gate 113. The output from the adder 109 is transmitted to a pair of gates 118 and 119, with the gate 119 passing the results of an addition, and the gate 118 passing the results of a subtraction. The outputs from the gates 118 and 119 are applied as inputs to an accumulator buffer register 121 whose output is applied simultaneously to the input of the accumulator 122 and to the input of an exponent difference register 123. Also feeding the input to buffer register 121 is the output of the AND gate 130 whose input comes from an OR gate 131, and also from the output of a gate 132. The gates 131 and 132 also receive input information from the output of the accumulator 122. Another gate 137 receives information from the control panel and passes that information to the input of the buffer register 121. The resultant sign of the overall arithmetic information is applied to and stored in a flip-flop 134 whose set output is applied through a gate 133 to the input of a second flip-flop 135. The set output of the flip-flop 135 is applied to the input of a flip-flop 136 whose set output applies the sign to the memory and to an input of a gate 126. The output of the gate 126 is applied to an input of the accumulator 121 and another output of the gate 126 is applied to the set input of the flip-flop 135.

The exponent arithmetic unit which is shown in FIG. 2C is really a portion of the large single arithmetic unit of this computer. However, the arithmetic unit provides three separate operations, and for ease of discussion, the apparatus is shown in three separate parts and described in the same way. That portion of the arithmetic unit shown in FIG. 2C performs operations upon the exponent of the number while that portion of the arithmetic unit shown in FIG. 2B is carrying out operations on the fraction portion of a number. The exponent arithmetic unit comprises at least an adder 109 and an accumulator 122. Input information from memory register 105 may be applied through the gate 106 to one input of the adder 109 where it is added together with information supplied through any of the gates 111, 112, 113, or 114 to the other input of the adder 109. Gates 112 and 113 supply the complements of the information normally applied to gates 111 and 114 so that the adder 109 also performs subtractions. The input information from the memory register 105 is also supplied through the line 36 to the OR gate 131 which performs logical OR operations with information supplied from the output of the accumulator register 122, and to the input of AND gate 132 which performs logical AND operations with the same information. The transmission of information through the OR gate 131 is controlled by an AND gate 130. The outputs from the logical OR and the logical AND operations are supplied to the input of the buffer register 121. The output of the register 121 is then applied to the input of the accumulator 122 where is it saved for use in subsequent operations.

Considering first the adder 109, information supplied to one side of the adder 109 can come from the accumulator 122. If the adder 109 is to perform an addition, gate 114 is opened, but if the adder 109 is to perform a subtraction, then gate 113 is opened to pass the inverted information from the accumulator 122. That information may be added together with the information from the memory register 105 which is supplied through the gate 106, or with instruction information from the ID register 23 which is supplied through the gate 107. One example of the manner in which the exponent adder 109 operates is to receive from the zero scanner 81 the number of spaces that the floating point fraction was shifted for normalization. This information is applied to the adder 109 through line 145 and the gate 108 and can be subtracted from information which is in the accumulator 122. Information can be brought into the memory register 105 from the memory and can be applied to the gates 131 or 132 so that logical OR or AND operations can be performed thereby upon information contained in the accumulator 122. The results of these logical operations are then applied to the buffer register 121, and the information stored in the register 121 is later applied to the accumulator 122. Information contained in the accumulator 122 can be applied to the salvage register 125 for later use, to the gates 131 and 132 for the logic OR and AND operations, or to the gates 133 and 134 for subtraction or addition operations by the adder 109 or to gate 127 for transmission to the M register 105. In the latter case, the output of the register 105 could be applied to the memory input to be stored for later use.

The exponent arithmetic unit shown in FIG. 2C comprises, for example, a seven-digit adder 109 which has two input channels 138 and 139, a seven-digit sum output 141, and a single-digit carry output 142. One input channel 138 to the adder 109 includes a gate 107 which has an input from the instruction register, a gate 106 which has an input connected to the output of a memory register 105, and a gate 108 which has an input connected to the output of the zero scanner 81 shown on FIG. 2B. The other channel input 139 of the adder 109 has connected to it the outputs from a gate 111 which has an input connected to the instruction register, a gate 112 which has the inverse output of the instruction register applied to it, a gate 113 and a gate 114, each of which has an input connected to the output of an accumulator 122. The accumulator 122 receives the sum output from the adder 109 through either of two gates 118 or 119 and a buffer register 121. The carry output 142 from the adder 109 is applied to the inputs of a gate 117 whose output is the overflow signal, and to a gate 115 whose output is applied to the input of the adder 109 as the loop-around carry.

In floating-point machines, the numerical information must be represented by a fraction and an exponent because shifting of one or another number to position the point creates a separate, effective exponent portion. Since numbers are handled in two portions in such machines a separate arithmetic unit is required for each portion if high operating speeds are to be maintained.

The exponent unit must be able to add the exponents when two numbers are multiplied and subtract the exponents when division is performed; it must be able to determine the amount of difference between two exponents when two numbers are being added or subtracted; it must be able to perform "logical" operations such as AND and OR with two numbers; and it must be able to transfer exponents from one register or memory location to another. To perform these functions the exponent arithmetic unit shown in FIG. 2C includes the adder 109. Since, in this example, the exponent is represented by seven binary digits and a sign, the adder 109 is a seven-digit adder with internal carry from one digit order to the next. The sum output 141 from the adder 109 is a seven-digit number which is eventually applied to the accumulator 122. Since the contents of the accumulator 122 can be applied to either of inputs of the adder 109 to take part in the operations being carried out by the adder 109, a buffer register 121 is inserted between the output 141 of the adder 109, and the input to the accumulator 122. In this way, the results of the adder's operations do not change the contents of the accumulator and, in turn, change the results from the adder, causing the system to oscillate. The single digit which results from a carry from the adder 109 is arranged to swing around and enter into the addition by the use of gate 115. When the carry designates an overflow, it can be transmitted through gate 117 as such, and it can be applied to the difference register 123 through gate 124 to ensure that the complete exponent difference is retained.

When two numbers are multiplied, their fractional portions are multiplied but their exponents are added. When two numbers are divided, one by the other their fractions are divided, one by the other, but their exponents are subtracted, one from the other. These exponential operations are carried out by the adder 109 with the associated circuitry as explained above. However, when two numbers are added together or one is subtracted from the other, the exponents cannot be handled in the same way. For addition and subtraction the exponents of the two numbers must be equal. Therefore, the two exponents are compared to determine by how much and in what direction they differe, and then one is shifted until they are equal. The two exponents are compared in the adder 109 which subtracts one exponent from the other, and the results are inserted into the difference register 123. In this case, since the difference can exceed seven digits, the carry from the adder 109 is applied through the gate 124 to the difference register 123 also. The output from the difference register, the amount stored therein, is applied to the product generator 58 by way of the right shift converter 62 which shifts the desired exponent by the determined amount as indicated in the copending application Flow-Through Multiplier, Ser. No. 58,956, filed in the manes of Harold R. Dell and Edwardo D. Lara on July 28, 1970. The product generator 58 shifts words applied to it to the right the designated number of spaces. To make equal the two exponents, the fraction associated with the smaller of the two must be shifted an appropriate number of spaces to the right. In order to accomplish this, the information contained in the difference register 123 is used to construct a shift word for use as a multiplier with the product generator 58, and the fraction of the smaller of the two numbers as determined by the sign of the information contained in the difference register is applied to the product generator 58 as the multiplicand. When a word from memory is to be operated upon, it is transferred from memory and is divided into its fraction and exponent portions. The fraction is applied to the fraction arithmetic unit and the exponent is applied to the exponent arithmetic unit. As mentioned above, the operations being performed result in the handling of the exponent in one or another of the ways set forth above. In addition to the functions set forth above, the AND gate 132 and the OR gate 131 provide logical functions which can be performed on the exponent. In this case, the information which is in the accumulator 122, and the information which is in the memory register 105, can be applied through the AND gate 132 to accomplish the logical AND function so that a portion of the accumulator word is cleared to zero, for example. Similarly, the accumulator 122 word can be applied to the OR gate 131 together with another word from the memory register 105 to accomplish the logical OR function.

In summary, the arithmetic unit is divided for explanatory and logical purposes into three parts. One part, shown in FIG. 2A is the control arithmetic unit which performs arithmetic operations upon instructions. The instructions can be applied to the control arithmetic unit of FIG. 2A and be processed or passed directly through it for application to the control unit itself. A second part is the fraction arithmetic unit shown in FIG. 2B. For floating-point operation, the information word which is entered into the computer is scanned to determine the number of leading zeros which are in the most significant digit positions before the first non-zero digit. This number is utilized to modify the exponent and causes the word to be shifted that number of spaces to the left. The shifted number is the fraction and is processed in the fraction arithmetic unit. The fraction arithmetic unit comprises many processing devices which are arranged in series and which are called upon for processing by the appropriate control signals. Information can be passed through the fraction arithmetic unit, if desired, without processing. In the fraction arithmetic unit there is a product generator 58 which receives two information words and multiplies one of those words by the other. The result is then transferred, with or without further processing, to the accumulator 77 and 78. Because products are twice the length of either of the two words supplied as multiplier and multiplicand, the output of the product generator 58 is applied to two registers and two paths. In addition to the product generator 58, the fraction arithmetic unit includes an adder 65–66, right shifter 64, a zero scanner 81, the usual buffer register 76 and accumulator 77–78, and the salvage register 79. With this apparatus and the associated gates, the fraction arithmetic unit can perform arithmetic and logical operations on information applied to it from memory or another storage device. The exponent arithmetic unit shown in FIG. 2C includes the adder 109, and the normal buffer, accumulator and salvage registers. It processes the exponent at the same time that the other two parts of the arithmetic unit are processing their particular parts of the information used in the computer.

Figure 3:
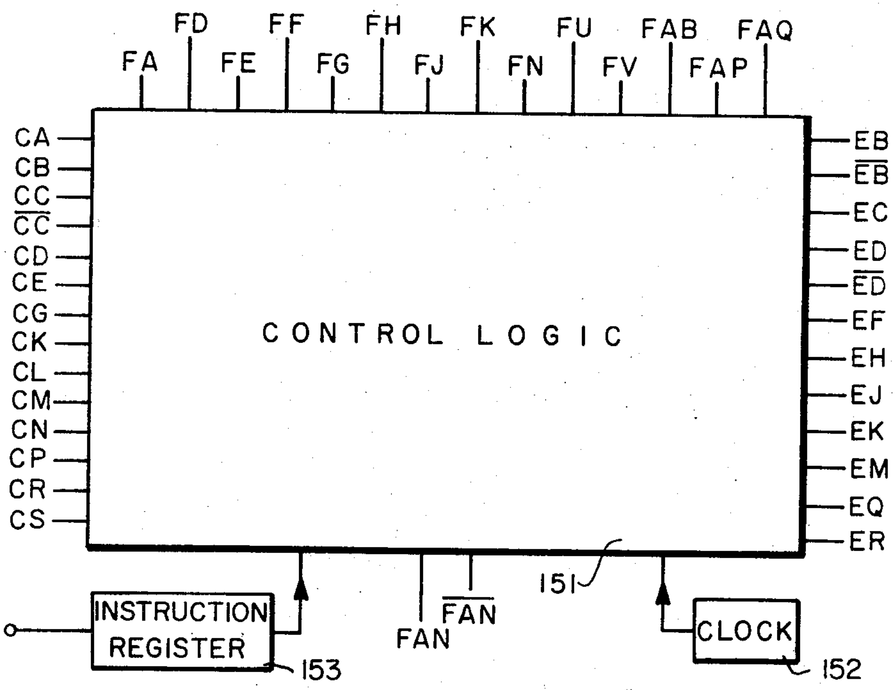
FIG. 3 is a broad block representation of the control unit of this invention showing the control signals generated thereby.

FIG. 3 illustrates in a very broad manner the control unit for this computer. Although it may be considerably less complex than control units for conventional computers, this control unit is constructed in a similar manner. Therefore, FIG. 3 shows a single block 151 as the control logic with signal lines emanating from it, a block 152 and an instruction register 153. Instructions are stored in the memory in prescribed addresses. An instruction is withdrawn from memory and is transferred to the instruction register 153 which applies it to the control logic 151 for decoding. Any suitable decoder such as a matrix may be used for this purpose. Decoding the instruction results in the energization of those particular signal lines which are required to carry out the instruction whenever a pulse is applied to the control logic 151 from the clock 152. The energization of the signal lines generally applies signals to gates throughout the system to open those gates which are to pass the information. Information then flows through the opened gates to those portions of the arithmetic unit which are to perform the designated operation on the information. This is the normal operation of a computer control unit, and the control unit of FIG. 3 is such a normal unit. However, the asynchronous nature of the arithmetic units of this computer permits the control unit to be much simpler than those for conventional computers. For example, there is no requirement for operation counters or similar devices in this control unit. The signal lines of FIG. 3 are labeled in a manner similar to the signal lines in FIG. 2*A*–2*C* but to avoid cluttering the drawings, the control lines have not been connected to the devices they control. Each of the output lines from the control logic 151 is energized only when two conditions are met. These are the selection of the line by the decoding of the instruction and the occurrence of a timing pulse generated by the clock 152. The use of the clock 152 permits the initiation and termination of individual instructions in sequence and in logical fashion while permitting the flow-through processing of information. Thus, the operation of the arithmetic units disclosed in FIG. 2A–2C is asynchronous, but the control unit shown in FIG. 3 is synchronous in operation.

The previous descriptions have been general descriptions which left most of the detail of construction and operation to the imagination. This was intentional since of fo the detailed structure and operation is shown elsewhere. The product generator 58 of FIG. 2B is described and illustrated in detail in the copending patent application Ser. No. 58,956, filed on July 28, 1970, in the names of Harold R. Dell and Edwardo D. Lara. The shifters, such as those designated 64, 62, 75, and 95 in FIG. 2B are described and shown in detail in the copending patent application entitled Flow-Through Shifter, Ser. No. 58,955, filed on July 28. 1970, in the name of Leslie T. Kyser now U.S. Pat. No. 3,659,274. Similarly, the zero scanner 81 of FIG. 2B is shown and described in detail in the copending patent application entitled Apparatus for Counting Zeros, Ser. No. 58,862, filed on July 28, 1970, in the name of Leslie T. Kyser. Another copending patent application entitled Digital Signal Lamp Circuit, Ser. No. 58,969, filed on July 28, 1970, in the name of William C. Booth describes and shows a circuit for indicating the contents of the registers. A binary divider may also be incorporated into this computer in the same manner that the product generator 58 is incorporated. Such a binary divider is described and shown in the copending patent application entitled asynchronous Binary Diver, Ser. No. 843,501, filed on July 18, 1969, in the name of William C. Booth. Many other circuits and components of this computer, shown in the various figures as symbols, are standard devices of which some examples may be given below.

Figure 4:
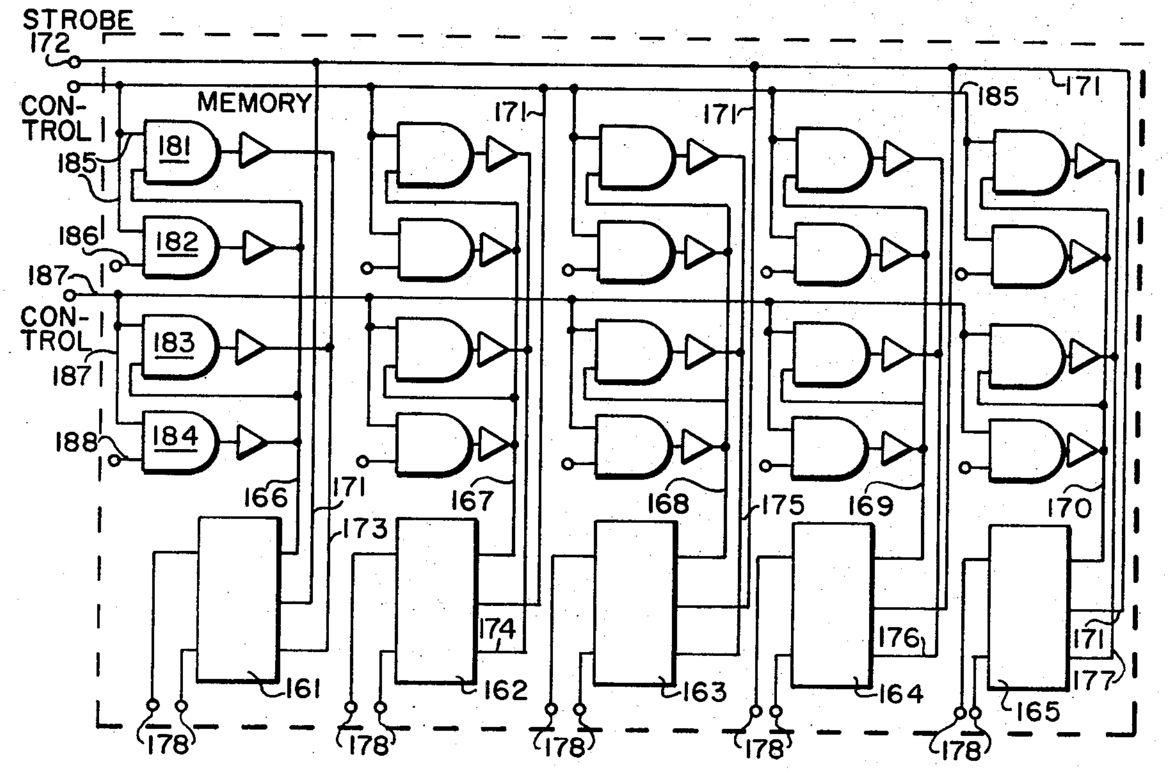
FIG. 4 is a logic block diagram of a typical register used in the computer of this invention.

The registers used in this computer may be standard flip-flop registers which are not particularly new in the art. However, an example of such a five-digit register is shown in FIG. 4. This register comprises five flip-flops 161, 162, 163, 164, and 165. Each of the flip-flops 161–165 has a restore input 166, 167, 168, 169, or 170; and a set input 173, 174, 175, 176, or 177. In addition, the flip-flops may be the clocked or strobed type which includes a strobe input 171. The outputs from all of the flip-flops 161–165 are labeled 178. Information is applied to the inputs of the flip-flops 161–165 through input circuits which ensure that the proper information is inserted into the flip-flops. Input information to flip-flop 161 is applied through four gates 181, 182, 183, and 184. A MEMORY CONTROL LINE 185 is connected to one input of each of the gates 181 and 182, with the output of gate 182 being connected through the inverter to both the other inputs of the gate 181 and to the restore input of the flip-flop 161. The output of the gate 181 is applied through an inverter to the set input of the flip-flop 161. Information is applied to the other input of gate 186 through the input terminal 182. Similarly, a keyboard control signal is applied to one input of the gate 184, the output of which is connected through an inverter to one input of the gate 183. The output of the gate 184 is also connected through the inverter to the restore input of the flip-flop 161, and the output of the gate 183 is connected through an inverter to the set input of the flip-flop 161. Keyboard information is applied to the other input of the gate 184.

In operation, when information is to be transferred from memory to the register, the control line 185 is energized and information is applied to the input terminal 186 of the gate 182. Should the information applied to the terminal 186 be a one, then the gate 182 opens to apply a zero to the restore input line 166. At the same time, the zero is also applied to the input of the gate 181 which is closed thereby. The gate 181 applies a one to the set input line 173. Nothing further happens until the strobe pulse is applied to the strobe line 171 by the control circuits or clock. When the flip-flops 161–165 are strobed, the information appearing on the input lines 166 and 173 is transferred into the flip-flop 161 and is made available at the output terminals 178. Assume, however, that when the control line 185 is energized, the information applied to the terminal 186 is a zero. Then the gate 182 is closed; a one is applied to the input of the gate 181 together with the control signal, and the gate 181 is opened. A zero is applied to set input line by the gate 181, and a one is applied to the restore input line 166 by the gate 182. By using the two gates 181 and 182 working together as they are shown, the flip-flop 161 need not be cleared and the information newly supplied drives the flip-flop 161 into the desired state. This saves the time of clearing. The two gates 181 and 182 receive information from the memory and insert it into the flip-flop 161.

The gates 183 and 184 are provided to accept information from a standard keyboard, control panel, and the like, and transfer that information into the flip-flop 161. Since a selection must be made whether the information to be inserted into the flip-flop 161 is to be from the memory or from the keyboard, there must be separate controls to make this selection. When information is to be transferred from memory, the control line 185 is energized; when information is to be transferred from the keyboard, the control line 187 is energized. The gates 183 and 184 are connected the same as the gates 181 and 182. One input to each of the gates 183 and 184 is connected to the control line 187. The other input to the gate 183 is applied from the output of the gate 184 through an inverter, and this output is also applied to the restore input 166. The output from the gate 183 is connected through an inverter to the set input 173. The other input to the gate 184 is connected to the terminal 188 which receives information from the keyboard (not shown). Since the rest of the circuitry is the same as described above, it will not be again described.

The operation of the keyboard input is the same as that of the memory input. When information is to be transferred into the flip-flop 161 from the keyboard, the control line 187 is energized. Then the information is transmitted from the keyboard to the terminal 188. Assume that the information applied to terminal 188 is a one, then the gate 184 is opened, and a zero is applied to the restore line 166 and to the other input of the gate 183. This keeps gate 183 from opening, and a one is applied to the set input 173 of the flip-flop 161. Should the information applied to the terminal 188 be a zero, then the gate 184 is maintained closed, applying a one to the restore input line 166 and to the other input of the gate 184. Gate 184 then opens, applying a zero to the set input 173.

Since the other stages of the register shown in FIG. 4 are merely duplicates of the first stage 161, they need not be described. Although a five-digit register is shown in FIG. 4, it should be understood that the register may be of any size desired to accomodate the computer word length. One form of register which is suitable for use in a computer of this type has been shown and described in detail to ensure that the description of the apparatus is complete. However, other types of register s may also be used.

Figure 5A:
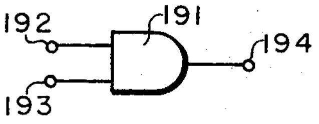
FIG. 5A and 5B are diagrams of sample gates.
Figure 5B:
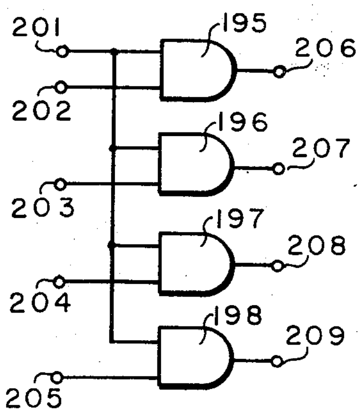

As mentioned earlier in this description, the symbology used in the description is consistent in shape, but not in size. The small symbols represent small capacity devices; the large symbols represent the large capacity devices. While it is felt that the intent is clear, FIGS. 5A and 5B have been included to illustrate what is intended and to avoid possible confusion. A large symbol of a gate 191 is shown in FIG. 5A. The gate 191 has an input 192 and a second input 193, and it has an output 194. Because of its size, it is apparent that this symbol 191 represents not just one gate, but enough gates to accomodate to words being processed at that point. Assume that the word at that point is a four digit word. Then, the actual circuitry represented by the single gate of FIG. 5A is shown in more detail in FIG. 5B. This circuit comprises four gates 195, 196, 197, and 198. Each of the gates 195–198 has one input connected to an input control terminal 201. The other inputs of the gates 195–198 are individually connected to information input terminals 202, 203, 204, and 205. When the control terminal 201 is energized, all of the gates 195–198 are conditioned to open if the information applied to its information input terminal 202–205 is one. Thus, all of the gates 195–198 operate together to accomplish the same operation with the individual digits of the word. They can be represented in the aggregate by a single gate such as 191 without loss of information.

Figure 6:
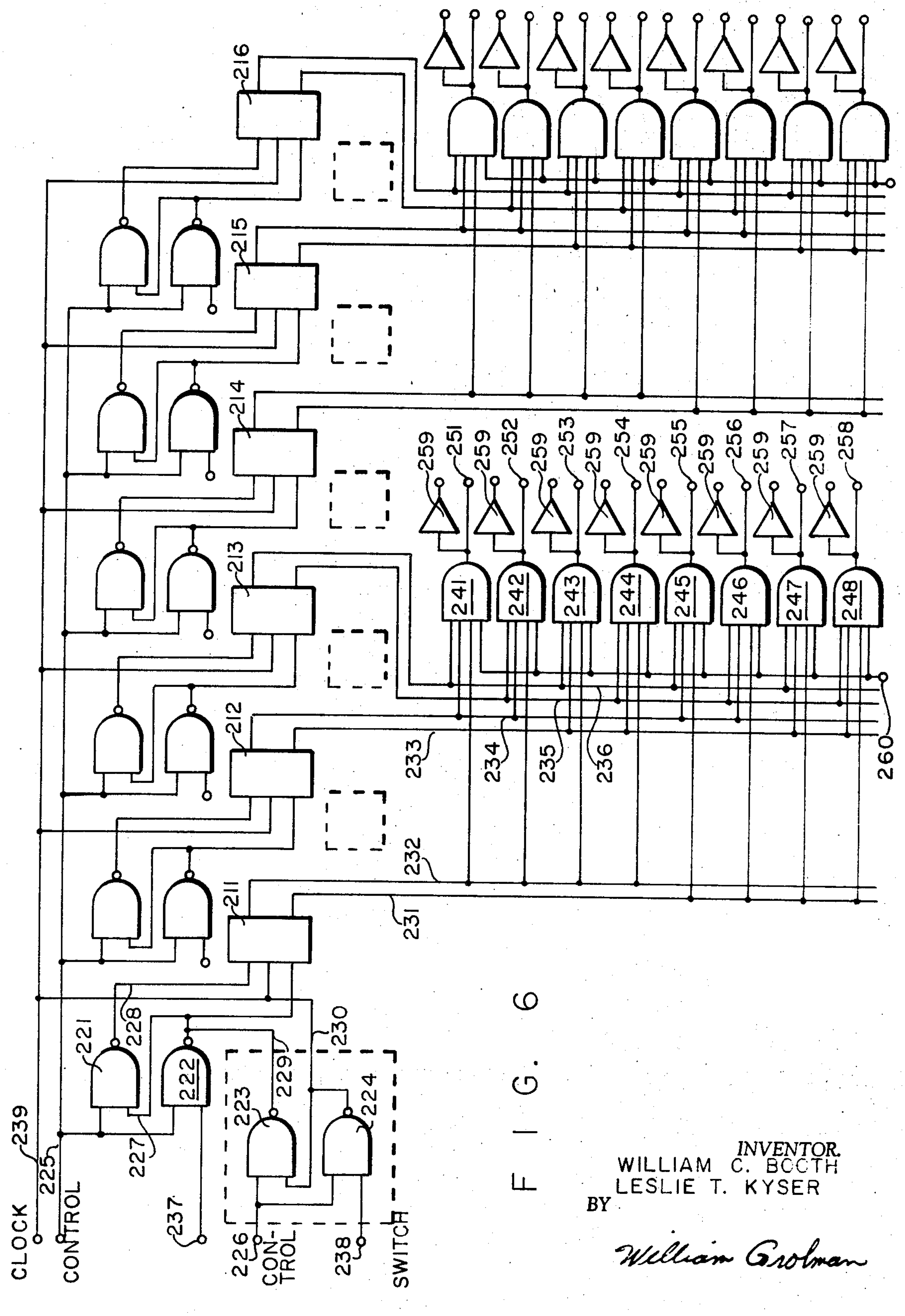
FIG. 6 is a logic block diagram of a sample control circuit as used in this computer.

As mentioned above, the control unit contemplated for use in this computer can be any suitable control unit which decodes the instruction words and generates the proper control signals on the proper lines. Usually, the decoders used in control units are decoding matrices. One example of the type of control unit contemplated is shown in FIG. 6. A portion of the instruction register, the operational code or IO portion, is shown in flip-flops 211, 212, 213, 214, 215, and 216. Each of the flip-flops 211–216 has two pairs of gates associated with its inputs as shown in FIG. 4. A strobe or clock line 239 is connected to the clock input of each of the flip-flops 211–216. The memory information control line 225 is connected to one of the inputs to each of gates 221 and 222 associated with the flip-flop 211. Information from the memory is applied to an input terminal 237 to gate 222; and the gates 221 and 222, and the gates 223 and 224 are connected as shown and described in connection with FIG. 4. The keyboard control signal is applied to input terminal 238 of the gate 224. The outputs of the flip-flops 211–216 are connected together into two matrices, each of which produces a one-out-of-eight decoding. The outputs from the flip-flops 211, 212, and 213 are connected to vertical lines 231, 232, 233, 234, 235, and 236. Each of eight gates 241, 242, 243, 244, 245, 246, 247, and 248, has three of its four inputs connected in various combinations to the six lines 231–236. The fourth input from all of the gates 241–248 is connected to an instruction line 260. By way of illustration, the gate 241 has its inputs connected to the set outputs of the flip-flops 211, 212, and 213. When all of these flip-flops are set by the input information, then the gate 241 is opened. The direct output from the gate 241 is taken from an output terminal 251, but an inverse output can be obtained through an inverter connected to an output terminal 259. Should the flip-flops 211–213 contain other information, say for example, 211 is set, 212 and 213 are restored, then a different gate will be opened. In this case, the gate 244 would open to pass an output signal. The fourth input to the gates 241–248 is the instruction input to control which of the decoders is to be used at any time. The output from any decoder can be used for further decoding, if desired, so that the actual decoding of instructions can be complex and extend to several layers. For example, suppose one of the outputs from the decoders shown in FIG. 6 is used as a control signal for a third decoder which decodes a further word. Then, the result of that decoding could be combined with other "first level" decoded signals to provide a larger variety of combinations. One of the advantages of using multilevel decoding is that the individual matrices are kept simple and readily constructed with fewer errors. They are also easier to maintain and repair. From the example given in FIG. 6, a large control unit for receiving instruction words and decoding those instruction words to produce the energization on the desired signal lines readily can be constructed.

One of the features of the computer of this invention is the capability of processing floating-point information without first requiring that information to be placed into a prescribed format before application to the computer. This permits the computer to operate online with information applied directly to it as it is generated. The number words are normalized in the computer by means of a normalizing instruction and the special equipment included in the computer. The result of the normalization is a two-part number comprising a fraction part and an exponent part. As mentioned above, when multiplication or division is performed, the exponents need only be added or subtracted in the exponent arithmetic unit shown in FIG. 2C, and the fraction parts of the words are handled in normal fashion. However, when two numbers are to be added or subtracted, the exponents must be equal. To accomplish this, the fraction arithmetic unit shown in FIG. 2B includes a right shift converter 62 which takes the results of an exponent subtraction, performed by the adder 109, and creates a special word to be used with the product generator 58 to shift one of the fraction parts the required number of places to the right to render the two exponents the same. One example of a right shift converter is shown in detail in FIG. 7.

Figure 7:
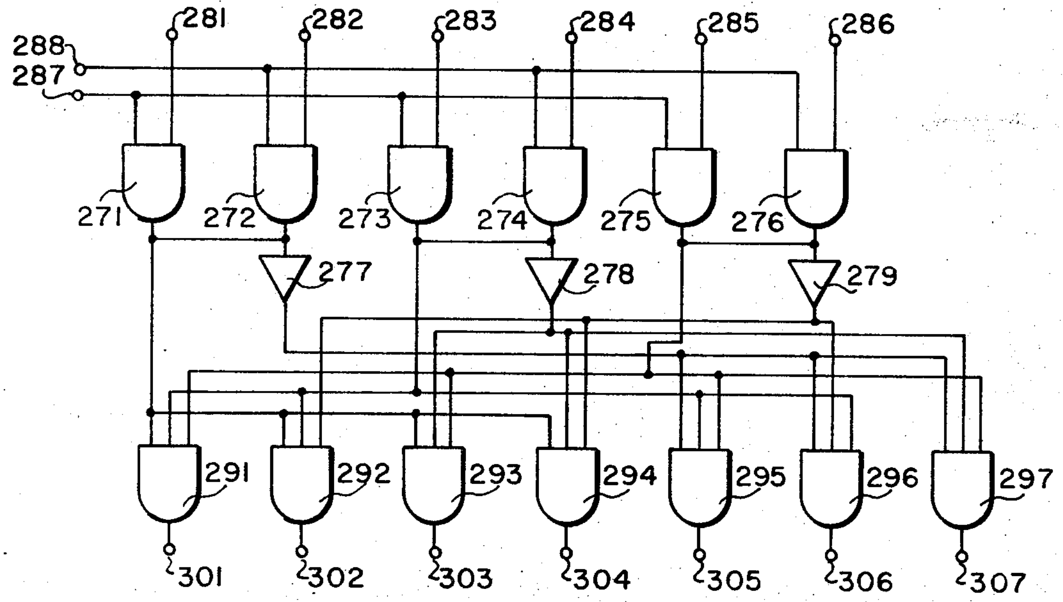
FIG. 7 is a logic block diagram of a sample right shift converter as used in the computer of this invention.

For the product generator 58 to shift a number a prescribed number of spaces to the right, that number is multiplied in the product generator 58 by a number which contains all zeros except for a one in the proper number position in the word. The right shift converter converts a number which has a value equal to the number of places to be shifted, into a word in which the single one occupies the proper place. In other words, the right shift converter converts binary information into positional information. In FIG. 7 a right shift converter which can control shifts up to seven places is shown. Six gates 271, 272, 273, 274, 275, and 276 are arranged in pairs with the odd numbered gates receiving individual digits from the exponent difference register 123 in FIG. 2C, and the even numbered gates receiving instruction information from the ID register. Since the shift to the right of digital information can be performed either as a result of the difference in exponents or due to an instruction to that effect, both sources of information are received by the converter. The odd numbered gates 271, 273, and 275 are connected to an exponent difference control terminal 287, and the even numbered gates 272, 274, and 276 are connected to an instruction control terminal 288. The outputs of the gates 271–276 are connected together in pairs, each pair of which represents a digit of a prescribed numerical significance. Thus, the outputs of the gates 275 and 276 are connected together and represent the digit of least significance; the outputs of the gates 273 and 274 are connected together and represent the digit of intermediate significance, and the outputs of the gates 271 and 272 are connected together and represent the digit of most significance. Each pair of gates has two outputs, a direct output and an inverted output, with the inverted output being supplied through one of the inverters 277, 278, or 279, and the six outputs are arranged in the form of a decoding matrix with a group of seven gates 291, 292, 293, 294, 295, 296, and 297. The outputs from the gates 291–297 are individually connected respectively to output terminals 301, 302, 303, 304, 305, 306, and 307. Each of the gates 291–297 has three inputs which are connected to the matrix of outputs from the gates 271–276 in unique combinations. The gate 291 has its inputs connected to the direct outputs from each of the pairs of gates 271– 276; gate 292 has its inputs connected to the direct outputs of gates 271–272 and 273–274 and the inverted output from the inverter 279; the inputs to the gate 293 are connected to the direct outputs from gates 271–272 and 275–276 and to the output of the inverter 278; gate 294 has its inputs connected to the output of gates 271–272 and to the inverters 278 and 279; gate 295 has its inputs connected to the inverter output 277 and to the direct outputs of gates 273–274 and 275–276; gate 296 has its inputs connected to the outputs of inverters 277 and 279 and to the direct output of gates 273–274; and gate 297 has its inputs connected to the inverter outputs of inverters 277 and 278 and the direct output of gates 275–276.

In operation, the right shift converter receives information from one of the two sources—the exponent difference register or the ID register. The appropriate control signal is applied to the proper input terminal 287 for exponent difference information and terminal 288 for instruction information. Assume for this discussion that instruction information is received on terminal 288 and that ones are applied to input terminals 282 and 286 and a zero is applied to terminal 284. The direct output from the gates 282 and 286 are ones, and the output from the inverter 278 is a one. Therefore, the only gate 291–297 which will open is that gate which has those three outputs connected to its inputs. This is gate 293 which opens and applies a one to the output terminal 303. All of the other gates 291–296 are closed and all of the other output terminals 301–307 have zeros applied thereto. The eighth terminal, which is not shown, is always zero. Thus, the input information was 101, which is equal to 5, and the fifth terminal from the least significant, terminal 303, has the single one in the shift control words which is 0010000. When this word is applied to the product generator 58 as a multiplier, the multiplicand will be shifted five places to the right in accordance with the teachings of the copending patent application of Dell and Lara, Flow-Through Arithmetic Apparatus, Ser. No. 58,956 mentioned above.

The computer of this invention has been designed to provide operating speeds which are far higher than the operating speeds of prior art general-purpose computers. To accomplish this objective, flow-through arithmetic devices have been used wherever possible. To take advantage of the high-operating speeds of the flow-through devices, the overall logic of the entire system has been designed so as not to interfere with the flow-through operation. In addition, the arithmetic unit has been provided with sufficient components to permit three simultaneous operations to proceed on three different items of information, an instruction, a fractional number, and an exponent. In the design of the fraction arithmetic unit, the flow-through characteristic of the arithmetic components has been utilized by arranging many of these components in cascade in a single information flow channel. The information is applied at one end and flows through the several components unchanged until it reaches the one component which is energized by the application of control potentials thereto. In that one component, the information is modified in accordance with the instruction, and the result continues its flow through the remaining components until it reaches the storage register at the end of the channel. For this type of operation to proceed with success, the several components in the channel must be fully compatible, the auxiliary components feeding various portions of the channel must be fully compatible with those in the channel, and the processing of the instructions must be performed with an eye open to the flow of information through the channel. Since most of the arithmetic processes performed in the computer as a whole are performed on the fraction portion of the data word, the improvement in the operation of this one portion of the system accounts for substantial improvement in the overall operating speed of the computer as a whole.

The control circuits of this computer are timed. Each instruction is stepped through its several phases by means of a clock. But, by eliminating the use of intermediate registers between each of the arithmetic components, the need for repeated strobing of information into a plurality of registers in its flow through the computer is eliminated, and the flow is speeded up. Thus, the timing of the instructions remains, in the end, dependent upon the presence of a timing pulse, but the basic time between instructions is determined by the length of time the previous instruction occupied. An example of the increased operating speed due to the sparing use of registers is the information flow channel of the fraction arithmetic unit mentioned above. The various arithmetic processors are arranged in cascade without intervening registers. As a result, the information can flow through the channel and is halted only at the end where it is inserted into the buffer register and then into the accumulator.

Generally speaking, instructions and information to be processed (data) are stored in memory from an outside source. Instructions are then recovered from memory and processed. One of the early instructions will be one which normalizes numerical information stored in memory. The number words are pulled from a memory location, the number of zeros which preceed the first nonzero digit are counted, the word is then shifted to the left that number of spaces to shift out all of the leading zeros, and the word is then returned to its memory location. From then on, all of the words in memory have the point immediately to the left of the most significant digit. Thus, information may be supplied directly to the computer of this invention without regard to the location of the point. The computer then operates to standardize or normalize all such information.

The above specification has described a new and improved high-speed computer. Its high speed has been achieved by the use of flow-through arithmetic components and the design of a system which utilizes those components to take advantage of their inherent simplicity and speed of operation. It is realized that the above description may indicate to others in the art additional ways in which the principles of this invention may be used without departing from its spirit. It is, therefore, intended that this invention be limited only by the scope of the appended claims.

What is claimed is:

1. A digital computer comprising a control unit, an arithmetic unit, and an information storage unit; said information storage unit being adapted to store data and instructions in digital form; said control unit comprising means for converting instructions received from said storage unit in digital form into operating potentials; said arithmetic unit comprising a first part for performing arithmetic operations upon instructions from said storage unit in digital form and a second part for performing arithmetic operations upon data in digital form; said data arithmetic unit comprising a fraction part and an exponent part for carrying out arithmetic operations upon fractional part and the exponent part of data words simultaneously; said fraction part of said data arithmetic unit comprising a cascaded array of arithmetic processors; said array including means for applying information thereto and means for receiving information therefrom, a product generator, said product generator having at least two inputs and two outputs, and means for supplying information in digital form to both of said inputs.

2. The digital computer defined in claim 1 wherein said array receives digital data in words having a prescribed number of digits and no assigned radix point position in any word and further includes means for determining the number of zeros in a digital data word which precede the most significant non-zero digit, and left shift means for shifting said digital data word the number of places to the left which are equal to the number of zeros which precede the most significant non-zero digit in said word.

3. The digital computer defined in claim 1 wherein said array further includes accumulating means for receiving and accumulating digital data supplied thereto, and means connected to the output of said accumulating means for storing the results of said accumulation.

4. The digital computer defined in claim 1 wherein said array further includes an adder, said adder having at least two inputs and two outputs, and means for connecting at least one input of said adder to at least one output of said product generator.

5. The digital computer defined in claim 4 wherein said array further includes first shift means for shifting digital data to the right a prescribed number of places, and further including means for indicating to said first shift means the number of places said digital data is to be shifted.

6. The digital computer defined in claim 5 further including second shift means for shifting said digital data to the right a fixed number of places when energized, and means for connecting said first and second shift means in cascade.

7. The digital computer defined in claim 6 wherein said array further includes accumulating means for receiving and accumulating digital data supplied thereto, and means connected to the output of said accumulating means for storing the results of said accumulation.

8. The digital computer defined in claim 6 wherein said array receives digital data in words having a prescribed number of digits and no assigned radix point position in any word and further includes means for determining the number of zeros in a digital data word which precede the most significant non-zero digit, and third shift means for shifting said digital data word to the left the number of places which are equal to the number of zeros which precede the most significant non-zero digit in said word.

9. The digital computer defined in claim 8 wherein said array further includes accumulating means for receiving and accumulating digital data supplied thereto, and means connected to the output of said accumulating means for storing the results of said accumulation.

10. A digital computer comprising a control unit, an arithmetic unit, and an information storage unit, said information storage unit being adapted to store data and instructions in digital form, said control unit comprising means for converting instructions received from said storage unit in digital form into operating potentials, said arithmetic unit comprising a first part for performing arithmetic operations upon instructions from said storage unit in digital form and a second part for performing arithmetic operations upon data from said storage unit in digital form, said data arithmetic unit comprising a fraction part and an exponent part for carrying out arithmetic operations upon the fractional part and the exponent part of data words simultaneously, said exponent part of said arithmetic unit comprising an adder means, said adder means having at least two inputs and two outputs, a first input channel connected to one of said adder inputs, a second channel connected to the other of said adder inputs, means for applying digital information to each of said input channels, a first register for receiving exponent information in digital form from an external source, means for connecting said first register to said first channel means for connecting, a second register to one of said outputs from said adder means, means for applying the output from said second register to the second channel, and means for complementing the output from said second register.

11. The digital computer defined in claim 10 wherein said exponent arithmetic unit further includes means for connecting said other output from said adder to an input of said adder to form a ring-around carry path.

12. A digital computer comprising a first, a second, and a third arithmetic unit, said first arithmetic unit comprising an adder, said adder having at least two inputs and a single output, a first information channel connected to one of said adder inputs and a second information channel connected to the other of said adder inputs, at least a first register having its input connected to the output of said adder and its output connected to said first channel, at least a second register having its input connected to the output of said adder and its output connected to said second channel, said first arithmetic unit further comprising means for receiving digital information from an external source, means for coupling said information to said first channel, and means for coupling said receiving means to the output of said adder.

13. The digital computer defined in claim 12 wherein said first arithmetic unit further includes a third register, means for connecting the input of said third register to the output of said adder and means for connecting the output of said third register to both of said first and second channels.

14. The digital computer defined in claim 13 wherein said first arithmetic unit further includes means for controlling the flow of information through said first and second channels and said means connecting the inputs and the outputs to said first, second and third registers and said adder.

15. A digital computer comprising a first, a second, and a third arithmetic unit, said second arithmetic unit comprising a plurality of arithmetic components connected in cascade to form a channel through which information flows, said arithmetic components individually selectively modifying the information passing through the particular component, said plurality of arithmetic components including a product generator, said product generator having two information inputs and an information output, means for connecting said output to an input of another arithmetic component, means for connecting one of said information inputs of said product generator in said information channel, and means for connecting the other information input of said product generator to a source of digital information, said product generator being adapted to operate with information flowing therethrough rather than being stepped therethrough.

16. The digital computer defined in claim 15 wherein said plurality of arithmetic components includes an adder having two inputs and an output, means for connecting one of said adder inputs in said information channel, means for supplying digital information to said other adder input from an outside source of digital information, means for controlling the application of digital information from an outside source to said other input of said adder, and means for connecting the output from said adder in said channel, said adder being adapted to operate with information flowing therethrough rather than with information being stepped therethrough.

17. The digital computer defined in claim 16 wherein said second arithmetic unit further includes means for supplying digital information to said channel intermediate said arithmetic components.

18. The digital computer defined in claim 17 wherein said second arithmetic unit further includes additional arithmetic units connected in cascade in said information channel, register means connected to said channel for receiving information which has flowed through said arithmetic components, and means for connecting the output from said register to an input of said channel.

* * * * *